United States Patent [19]

Chatterjee

[11] Patent Number: 4,853,426

[45] Date of Patent: Aug. 1, 1989

[54] IN-REACTOR STABILIZATION OF POLYOLEFINS VIA COATED STABILIZERS

[75] Inventor: Ananda M. Chatterjee, Houston, Tex.

[73] Assignee: Shell Oil Company, Houston, Tex.

[21] Appl. No.: 147,953

[22] Filed: Jan. 25, 1988

[51] Int. Cl.$^4$ .............................................. C08K 9/10
[52] U.S. Cl. ................................... 524/100; 524/101; 524/29; 524/487; 526/78; 526/79; 523/210
[58] Field of Search ..................... 427/213; 106/502; 523/210; 524/487, 488, 489, 100, 101, 291; 526/78, 79

[56] References Cited

U.S. PATENT DOCUMENTS

| | | | |
|---|---|---|---|
| 3,271,185 | 9/1966 | Pollock | 427/213 |
| 3,485,812 | 12/1969 | Anspon et al. | 526/78 |
| 3,546,150 | 12/1970 | White et al. | 260/28.5 |
| 3,591,409 | 7/1971 | Aubrey et al. | 117/100 C |
| 3,971,749 | 7/1976 | Blunt | 260/33.4 |
| 3,977,992 | 8/1976 | Hofacker | 252/316 |
| 3,985,840 | 10/1976 | Hofacker | 264/4 |
| 4,002,458 | 1/1977 | Hofacker | 71/27 |
| 4,098,945 | 7/1978 | Oehmke | 428/327 |
| 4,224,422 | 9/1980 | Rude et al. | 525/454 |
| 4,277,288 | 7/1981 | Lawrence et al. | 106/502 |
| 4,299,885 | 11/1981 | Sahajpal et al. | 523/210 |
| 4,306,993 | 12/1981 | Danielson et al. | 252/136 |
| 4,329,253 | 5/1982 | Goodall et al. | 252/429 |
| 4,382,326 | 5/1983 | Rabuse | 29/270 |
| 4,414,132 | 11/1983 | Goodall et al. | 502/169 |
| 4,659,506 | 4/1987 | Nakamura et al. | 523/210 |

FOREIGN PATENT DOCUMENTS 2160852 12/1971 Fed. Rep. of Germany .
5621815 7/1979 Japan .

OTHER PUBLICATIONS

H. S. Hall & R. E. Pondell, Chapter 7, "Controlled Release Technologies: Method, Theory and Applications", vol II, A. F. Kydonieus, Ed. CRC Press Boca Raton, Fla. 1980.

*Primary Examiner*—Veronica P. Hoke

[57] ABSTRACT

The present invention includes:
(i) a method for making a coated particulate comprising the steps of
heating until liquid a polyolefin wax;
fluidizing with a hot gas, additive particles selected from the group comprising an antioxidant, a processing stabilizer, an acid acceptor, and mixtures thereof;
spraying the liquid polyolefin wax on the heated fluidized additive particles, and
maintaining the fluidized additive particles at a temperature which is sufficient to prevent the formation of fibers and adequate to form discrete substantially coated additive particles;
(ii) a coated particulate made by the above process; and
(iii) a process for providing in-reactor stabilization of a polyolefin during a polymerization reaction, using the coated additives prepared by the above described method.

11 Claims, No Drawings

IN-REACTOR STABILIZATION OF POLYOLEFINS VIA COATED STABILIZERS

FIELD OF THE INVENTION

This invention is generally concerned with a method of making coated additives for a variety of uses including: (a) addition to a polymerization reactor, to produce non-extruded product which contains stabilizer, and (b) preparation of concentrates or masterbatches of additives or pigments via a non-extrusion route.

The present invention relates to an improved process for incorporating into polyolefins during olefin polymerization (in the polymerization reactor) coated stabilizers, in particular, additives like antioxidants, and obtaining desirable yield, isotacticity and oxidative stability while reducing the cost and avoiding the pelletization steps currently required for adding stabilizers and other additives into polymers.

The invention calls for the addition of coated stabilizer into a reactor during polymerization in such a way as to prevent deactivation of the catalyst during polymerization.

BACKGROUND OF THE INVENTION

The method traditionally employed for incorporating dry additives into polymers involved first, polymerizing the monomer, then adding stabilizers to the polymer by extrusion or other melt mixing techniques, thereby producing pellets, Stabilizers have traditionally not been added into the polymerization reactor because neat stabilizers usually deactivate the polymerization catalyst and terminate the polymerization reaction. Disadvantages of the current melt mixing techniques include an appreciable downtime for cleaning of the blending equipment, heat sensitivity of some additives, and pelletization problems, particularly with very high melt flow (>100 g/10 min) polypropylene resins.

A variety of patents teach methods for blending additives with polymers. One such patent is U.S. Pat. No. 3,591,409. U.S. Pat. No. 3,591,409 teaches a method for preparing a composition by high intensity blending of a mixture of particulate thermoplastic resin, hydrocarbon wax, and particulate solid additive at high temperatures. This teaching requires that all ingredients be placed in the mixer at once, without the separate pretreatment of any one of the components of the mixture.

In contrast with this conventional teaching, it has been discovered that by adding discrete particles to the reactor during polymerization (wherein the particles consist of a core of additive surrounded by a polymer wax), good yield of stabilized polymer can result.

A variety of patents teach methods for making discrete particles or capsules containing different kinds of fill materials. U.S. Pat. No. 4,306,993 to Minnesota Mining & Manufacturing Company discloses a method for making microcapsules which can be used to tag books, paper currency and especially explosives and explosive devices. Other discrete particle preparation techniques are disclosed in the following patents: DT No. 2,160,852 which discloses microcapsules containing wetting agents, and U.S. Pat. No. 4,224,422 which discloses a curable epoxy resin polyisocyanate system useful as an adhesive wherein the curable one part system comprises a rupturable impermeable microcapsule having shell walls of a crosslinked interfacial polyurethane-polyether reaction product of an aromatic polyisocyanate. U.S. Pat. No. 4,382,326 describes acrylate copolymer microsphere structures using glycerol and cycloaliphatic polyepoxides filled with a liquid Lewis acid-glycerol complex. Tacky spherical acrylate copolymer particles are disclosed in Minnesota Mining & Manufacturing Company U.S. Pat. No. 4,098,945. U.S. Pat. No. 4,098,945 teaches a liquid-filled capsule having a microporous capsule wall made of a dispersed solid-phase and a continuous phase, wherein the capsule forms a single phase in the liquid state but separate phases when cooled to solid, and wherein the volume contraction ratio is greater than or equal to 1.2. The preferred capsules are spherical and the wall is made of the solid, crystalline olefin polymer; an amorphous hydrocarbon resin and an at least partially crystalline wax capable of separating out as a discontinuous mass.

Liquid-filled capsules for controlled release of fertilizers having a microporous wall of crystalline polyolefin, hydrocarbon resin and a wax are disclosed in U.S. Pat. No. 4,002,458. U.S. Pat. No. 3,985,840 describes microspheres prepared by forming a homogeneous molten liquid phase using a solid crystalline olefinic polymer, a hydrocarbon resin and at least partially crystalline wax, and wherein the liquid phase is allowed to cool and the wax separates out as a discontinuous mass dispersed throughout the matrix. U.S. Pat. No. 3,977,992 discloses a controlled release capsule prepared from 2% wax, 5% hydrocarbon resin and the remainder of crystalline olefinic polymer such as polyethylene.

Since it has long been desired to find a method of cheaply blending stabilizers, antioxidants and other additives into polymers in the reactor without compounding or extruding, such that these additives are dispersed throughout the polymer, a novel invention has been developed.

Since it has been desired to achieve a method of blending additives into polymers, without resorting to a process requiring the use of solvents, the present invention was developed; this invention relates to the preparation of coated additives that can act as antioxidant and/or stabilizer, and which can be incorporated into a polymer during polymerization, on short notice, and with good efficiency.

SUMMARY OF THE INVENTION

The present invention includes:
(i) a method for making a coated particulate comprising the steps of
  heating until liquid a polyolefin wax;
  fluidizing with a hot gas, additive particles selected from the group comprising an antioxidant, a processing stabilizer, an acid acceptor, and mixtures thereof;
  spraying the liquid polyolefin wax on the heated fluidized additive particles; and
  maintaining the fluidized additive particles at a temperature which is sufficient to prevent the formation of fibers and adequate to form discrete substantially coated additive particles;
(ii) a coated particulate made by the above process; and
(iii) a process for providing in-reactor stabilization of a polyolefin during a polymerization reaction, using the coated additives prepared by the above described method.

It is preferred these substantially coated particles have diameters ranging from about 100 to about 8000 micrometers. It is preferred that the additive usable herein be a member of the group including antioxidants like 1,3,5-trimethyl-2,4,6-tris(3,5-di-tert-butyl-4-hydroxy-benzyl)benzene (A); octadecyl 3-(3′,5′-di-tert-butyl-4′-hydroxyphenyl) propionate (B); tetrakis[-methylene (3,5-di-tert-butyl-4-hydroxyhydrocinnamate)]methane (C); tris(3,5-di-t-butyl-4-hydroxybenzyl) isocyanurate (D); 3,5-di-tert-butyl-4-hydroxyhydrocinnamic acid triester with 1,3,5-tri(2-hydroxyethyl)-s-triazine-2,4,6(1H,3H,5H)-trione (E); 1,3,5-tris(4-tert-butyl-3-hydroxy-2,6-dimethylbenzyl) 1,3,5-triazine-2,4,6-(1H,3H,5H)-trione (F); bis-[3,3-bis(4′hydroxy-3′tert-butylphenyl)-butanoic acid]-glycolester (G); 2,2′-methylene-bis-[(4-methyl-6-tertiary-butyl-phenol)-terephthalate](H); and 2,2-bis[4-(2-(3,5-di-tertbutyl-4-hydroxyhydrocinnamoyloxy)) ethoxy-phenyl]propane (I), calcium bis[monoethyl(3,5-di-tert-butyl-4-hydroxybenzyl)phosphonate](J); 1,2-bis(3,5-di-tert-butyl-4-hydroxyhydro cinnamoyl)hydrazine (K) and 2,2′-oxamido bis-[ethyl 3-(3,5-di-tert-butyl-4-hydroxyphenyl)propionate](L). Considering the melting point so fthese antioxidants, A, D, F, G, H, J, K, and L can be coated by isotactic polypropylene homopolymer. Polyethylene wax of melting point 100°–105° C. can be used to coat antioxidants A and C through L. Additional additives which may be used separatedly or blended with the above listed antioxidants may include processing stabilizers like phosphites, phosphonite; acid acceptors like metallic stearates, metal oxides, hydrotalcites (e.g., Kyowa Chemical Industries'DHT-4A and DHT-4C); nucleating agents; lubricants antistatic agents; fillers like barium sulfate, clays, calcium carbonate, silicates, magnesium oxide; pigments, such as titanium dioxide, zinc oxide, lead chromate, cadmium sulfides, cadmium selenide, zinc sulfide, basic carbonate of white lead; stabilizers such as tribasic lead sulfate, basic lead chlorosilicate, dibutyl tin oxide and other salts of lead, zinc, cadmium, tin, and the like; flame retardants such as antimony oxide; ultra-violet stabilizers, slip agents, antiblock agents, and other solid additives which enhance the properties and processability of the polyolefin to which they are added.

In preferred embodiments, the polyolefin wax coating can be either polypropylene wax, polyethylene wax or a mixture therein. The initial heating of the polyolefin wax preferably is carried out at temperatures between about 110° C. and about 180° C. In a preferred embodiment, the fluidized additive particles to be coated, are heated to a temperature between about 150° C. and about 180° C.

The coated particulate of the present invention consists essentially of a core of at least one additive, such as those identified above, wherein the core is coated with a polyolefin wax which is solid at polymerization temperature. In a preferred embodiment, the polyolefin coating consists of at least about 15% to about 85% by weight of the particle, wherein the percentages are based on the total composition of the particle.

The process for providing in-reactor stabilization of a polyolefin of the present invention comprises:

(i) forming a particulate adapted for use in olefin polymerization reactions, by the steps consisting of
heating until liquid a polyolefin wax;
fluidizing with a hot gas, additive particles selected from the group comprising of an antioxidant, a processing stabilizer, an acid acceptor, and mixtures thereof;
spraying the liquid polyolefin wax on the heated fluidized additive particles; and
maintaining the fluidizing additive particles at a temperature which is sufficient to prevent the formation of fibers and adequate to form discrete substantially coated additive particles;

(ii) adding said discrete substantially coated additive particles directly to a polymerization reactor; and (iii) polymerization said olefin in the presence of said particulate.

Polymerization of alpha olefins like propylene with titanium halide/aluminum alkyl catalyst systems is most preferred.

Within the scope of the invention, it is contemplated that the particulate comprise an additive core which can be one or more of a variety of compounds, including but not limited to: acid acceptors, processing stabilizers, antioxidants, metal deactivating agents, nucleating agents, pigments, heat stablizers, light stabilizers, lubricants, antiblock agents, antistatic agents, and slip additives which are capable of enhancing the properties and processability of the polyolefin. For a typical particulate, within the scope of this invention, the concentration of the additive can range from about 5wt% to about 85wt% of the total mass of the particle.

DETAILED DESCRIPTION OF THE INVENTION

The present invention involves at least two basic concepts, (1) the formation of a novel coated particulate, prepared such that the particle comprises a core of additive and a coating of a polymer wax and (2) the incorporation of the novel, formed, coated particulates within a polymer matrix during polymerization in the reactor, wherein the coating of the particulates acts as a barrier between the catalyst system and the additive during polymerization.

The outer coating of the particle can be one or more polyolefins with the monomers having from 2 to 18 carbon atoms, such as propylene or 1-butene. A hydrocarbon wax, such as a polypropylene wax with a weight average molecular weight of 10,000 to 30,000, and which is primarily isotactic, such as Hoechst Wax PP 230 produced by Hoechst, can function as a good outer coating within the scope of this invention.

Specific examples of suitable olefins whose polymers are usable as the outer coating include ethylene, proplyene, butene-1, copolymers of ethylene and proplyene, copolymers of propylene and butene-1, copolymers of ethylene with at least one other alpha olefin containing from 2 to 18 carbon atoms, in the repeating unit and more preferably containing from 2 to 8 carbon atoms.

The selected polyolefin for the outer coating should not cause color formation, staining or degradation of the base polymer composition in which the coated particulates are being incorporated. The polyolefin of the outer coating should be relatively easy to incorporate into the polymer. More specifically the outer coating should not be reactive with the base polymer. If polypropylene wax is used as the coating material, it (in low concentration) can be left in the final polypropylene composition.

The outer coating material may be either of the natural or synthetic type. Typical examples which are preferred for use in the coating material include hydrocarbon waxes, such as polypropylene, polyethylene, paraffin wax, ester waxes, such as spermaceti, mineral waxes, such as montan wax, amide waxes such as ethylene distearamide and ethylene diresorcinolamide, halogenated hydrocarbon waxes, such as chlorinated paraffin waxes, chlorinated naphthalenes and ketone waxes, such as stearone.

The melting point of the coating should be at least high enough so that the outer coating remains solid at room and storage temperatures. It is preferred that the coating material soften or melt at between about 100° C. and about 180° C. for convenience of its incorporation during proplyene polymerization.

Waxes and wax-like materials can be employed alone or in mixtures of various proportions as the coating layer in the novel particulate. One of the most preferred outer coatings is polypropylene. The individual components of the coating should be melted together before being coated on the core of additive. This melting should occur at temperatures between about 150° C. and about 180° C. The coating can then be applied to the additive core by a heating and/or blending and/or spraying operation.

One or more coatings can be applied to the additive core through spraying or a variety of other techniques. For example, the additive powder can be heated and fluidized using hot air. Simultaneously with the heating of the additive powder, the coating material can be heated until the coating material becomes a liquid. The liquid coating material can then be sprayed onto the fluidized additive powder. Only sufficient liquid coating material should be added to the fluidized additive to form the coated particles of additive having desired diameters. The additive core can be coated with additional layers to form the particulate. Optimum operating conditions for the fluidized bed are shown in Table I.

Following the completion of the coating step, the coated additive particulate is introduced into the polymerization reactor for incorporation into the polymer. This incorporation advantageously occurs without the use of any additional solvents or diluents.

For gas phase fluidized bed polymerization of the olefin, the coated additive particles can be introduced into the fluidized zone of monomer in the reactor. Depending on the particular additive and its function, the amounts to be incorporated into the polymer can be varied in accordance with the percentages known to the art to achieve the desired polymer properties.

In addition to coated additive and monomer, cocatalyst, selectivity control agent and catalyst can be added to the polymerization reactor. It is contemplated that the coated particles be usable for all types of polymerization, e.g. liquid pool polymerization, gas phase polymerization, solvent slurry polymerization, and polymerizations suggest by U.S. Pat. Nos. 4,414,132 and 4,329,253 owned by Shell Ohio Company. Sieved fractions of the coated additives can also be added to the polymerization reactor.

Good results have been obtained with polypropylene wax coatings on solid additives, for incorporation into polypropylene. The wax coating serves to prevent early or inadvertent deactivation of the catalyst by the additive underlying the coating. One important advantage of this occurs in further melt processing of the polymer by the customer, in that, in the extruder the frictional or applied heat causes the wax coating to melt and thereby promotes dispersion of the additive throughout the resin. Since the polypropylene wax is predominantly isotactic, it can be left in the final product.

From about 5 to about 85 percent by weight of additive (based on the total weight of the particle) can be used in a coated particle for use in stabilizing a polyolefin. Tests have been conducted on a number of different kinds of additives (coated with polypropylene wax), including Irganox 3114, an additive for polymers and particularly useful as a stabilizer for polypropylene compositions.

The novel wax-coated additives can reduce abrasion of the surfaces of processing machinery, and thereby reduce undue wear and erosion of metal surfaces in contact with the final resin composition (including the working parts of the processing equipment). Screw and barrel cleaning presents problems in these types of operations. Metal contamination caused by abrasion is a serious source of discoloration and degradation of the resins and the use of this novel coated additive reduces the magnitude of this problem.

Wax-coated additives can minimize the dusting tendencies of the finely divided additives, and thereby prevent the generation of toxic dusts and minimize dust explosion hazards.

The coated additives are advantageously used in polymers like polyproylene, chlorosulfonate polyethylene, ethylene-proylene copolymer rubbers, ethylene-propylene terpolymers, butyl, butadienestyrene, silicone, acrylonitrile rubbers, and the like. The coated additives are usable in plastics, for example, polyvinyl chloride polymers and copolymers, polyethylene and copolymers polypropylene, polyvinyldene chloride, polystyrene, polyimides, polyamides, polyacetals, acrylonitrile-butadiene-styrene, polycarbonates, polycaprolacetone, poly(ethylene oxide), chlorinated polyethylene, polymethyl methacrylate, polyaromatic sulfones, and the like.

The invention will be described in greater detail in terms of the examples presented below. In no way are these examples intended to limit the invention to the embodiments specifically shown therein. All parts and percentages given are by weight unless otherwise specified.

EXAMPLES

Additives were coated with polypropylene (PP) wax (Hoechst 230), by the method described below and then subsequently added to a propylene polymerization reactor. The polypropylene wax was used as a barrier between the polymerization catalyst and the additives, therein inhibiting deactivation of the catalyst (during polymerization) by the additive. Additives added directly to polymerization reactors deactivate the polymerization catalyst and thereby stop the polymerization. When propylene polymerization was attempted with Irganox 3114 and ZnO directly added to the reactor, no polymer was produced. The advantages of using coated additives of the present invention can be seen on Table II. Additives used were Irganox 3114 (available from Ciba-Geigy Corporation), Ultranox 626 (available from Borg Warner Chemicals), and ZnO (Kadox 25) (available from New Jersey Zinc Company). The fluidized bed coating experiments were conducted at Coating Place Incorporated (Verona, Wisconsin), using the Wurster process, described in H.S. Hall and R. E. Pondell, Chapter 7, in "Controlled Release Technologies: Methods, Theory and Applications", Vol. II, A.F. Kydonieus, Ed. CRC Press, Boca Raton, FL, 1980. In this process the coating material is sprayed or atomized through a nozzle onto a fluidized bed of solid core material.

Two stabilizer mixtures were coated. Mixtures 126-1 and 126-2 (same composition) contained Irganox 3114, Ultranox 626 and zinc oxide in the weight ratio 10:5:4. Mixture 126-5 contained Irganox 3114 and ZnO in the weight ratio 10:4. These mixtures were prepared by dry blending the solid stabilizers.

The PP wax used as coating was Hoechst Wax PP 230, which is predominantly isotactic polypropylene with weight average molecular weight of about 25000 and softening point (Ring and Ball) of about 158° C.

In all the coating examples, a fluidized bed equipped with a spray nozzle in the bottom of the reactor was used to prepare the coated particles. The air used for additive bed fluidization was heated to a temperature of about 150° C. to about 160° C. The wax, which is a low molecular weight isotactic polypropylene was delivered to the fluidized additive bed with a Zenith gear pump.

COATING OF ADDITIVES

The coating chamber was 4 inches in diameter at the bottom and 6 inches at the top. The spray nozzle was mounted at the base of this chamber. The molten polypropylene wax at 200° C. was delivered by a heated Zenith gear pump (1.75 cc/revolution) to the spray nozzle. Here the atomizing air produced a fine spray of the polypropylene wax which coated the stabilizers in the fluidized bed. The operating conditions, have been previously mentioned and appear in Table 1.

taining propylene and hydrogen: (1) mixture of triethyl aluminum (TEA) cocatalyst (see Table II) and diphenyl dimethoxy silane selectivity control agent (40 microliter), (2) SHAC® 201 catalyst (0.4 ml in mineral oil), available through the Shell Chemical Co., Houston, Texas, and (3) coated additive suspended in mineral oil. SHAC 201 catalyst is obtained by halogenating a magnesium compound of the formula MgR'R" (wherein R' is an alkoxide or aryloxide group or halogen, and R" is an alkoxide, alkyl carbonate, aryloxide or halogen) with a halide of tetravalent titanium and an electron donor, contacting the halogenated product with a tetravalent titanium halide, washing it to remove unreacted titanium and electron donor, contacting the halogenated product with a tetravalent titanium halide, washing it in an inert solvent to remove unreacted titanium compounds and recovering the solid product.

Xylene solubles (XS) of the resultant polymers where determined as the percentage of material remaining soluble, when cooling a solution of polymer in xylene, from its boiling point to room temperature.

Thermo-oxidative stability of the polypropylene was determined by both oven aging and oxidative induction time (OIT) measurements. The polypropylene produced in the reactor was compression-molded into 10-mil thick specimens. For oven aging these 1-inch X 1.5-inch specimens were placed in a forced circulation hot air oven maintained at 125±0.1° C. The aging procedure followed the guidelines of ASTM D3012. The samples were inspected daily, and failure was indicated by characteristic powdery disintegration and brittleness

TABLE I

Operating Conditions for Fluidized Bed Coating of Stabilizers

| Run No. | Fluidizing Air Temp (°C.) In | Fluidizing Air Temp (°C.) Out | Fluidizing Air Flow Rate (SCFM) | RPM of Pump | Atomizing Air Pressure (psi) | Atomizing Air Flow Rate (SCFH) | Polypropylene Wax Line Temp (°C.) |
|---|---|---|---|---|---|---|---|
| 319-A1 | 104 | 65 | 38 | 20 | 30 | 125 | 220 |
| 319-A2 | 154 | 104 | 35 | 20 | 30 | 125 | 232 |
| 320-A4 | 160 | 77 | 30 | 18 | 20 | 79 | 238 |
| 320-A5 | 154 | 77 | 30 | 18 | 20 | 82 | 238 |

In Example 1 (run 319-A1) 456 g stabilizer mixture 126-1 was fluidized by air, with the objective of coating it with polypropylene wax. The coating was not successful, because the polypropylene wax formed fiber after exiting the nozzle, instead of atomizing. The fiber formation was caused by the relatively low inlet temperature of the fluidizing air (104° C.). In the next run (319-A2) this temperature was raised to 154° C.

In Example 2 (run 319-A2) 500 g stabilizer mixture 126-2 was coated with 504 g polypropylene wax during a 24 minute run. The coated stabilizer showed visibly larger particle size than the starting stabilizers.

In Example 3 (run 320-A4) 1 kg stabilizer mixture 126-5 was coated with 200 g polypropylene wax during a 14 minute run.

In Example 4 (run 320-A5) 1 kg of the coated product from run 320-A4 was coated with 200 g polypropylene wax during a 14 minute run.

POLYMERIZATION

Batch liquid propylene polymerizations were run in a one gallon autoclave (2.7 liter propylene charge) at 67° C. for one hour using SHAC 201 catalyst. The following injections were made sequentially to the reator conof the polymer.

For OIT measurement, about 5 mg of the compression-molded sample was crimped in a Difference Scanning Calorimeter (Perkin-Elmer model DSC-2). The sample was heated to the test temperature under nitrogen, and then the nitrogen gas was replaced by oxygen. From this time (t=0) onward, scanning was done in the time mode. A tangent was drawn to the exothermic oxidation peak; the intersection of this tangent with the initial baseline, measured from t=0, gave the oxidative induction time or OIT. Note that higher oven life or OIT values indicate greater oxidative stability of the polymer. See Table II for polypropylene stability tests results.

It is contemplated that other organoaluminum compounds be usable herein, for example an organoaluminum compound selected from the group comprising diethyl aluminum chloride, ethyl aluminum dichloride, and ethyl aluminum sesquichloride, and that other selectivity control agents may be usable herein such as a selectivity control agent selected from the group comprising: paraethoxy benzoate, ethyl paratoluate, paramethoxy ethyl benzoate, phenyl triethoxysilane and 2,2,6,6-tetramethyl piperidine.

TABLE II

Propylene Polymerization Using Coated Stabilizers

| Run No. | Milli-Mole TEA | Coated Additive(a) | Yield Kg PP/g Cat | XS (% w) | Bulk Density (g/cc) | Oven Life (days) at 125° C. | OIT (Min) at 170° C. | OIT (Min) at 190° C. |
|---|---|---|---|---|---|---|---|---|
| XG-089 | 1.4 | 319-A2 | 6.5 | 5.7 | 0.33 | >81 | — | 47.2 |
| XG-090 | 2.1 | 319-A2 | 7.5 | 5.5 | 0.33 | >81 | — | 32.2 |
| XG-087 | 1.4 | 320-A4 | 7.9 | 5.3 | 0.34 | 10 | 27.5 | — |
| XG-086 | 1.4 | 320-A5 | 10.5 | 5.9 | 0.35 | >131 | >40 | 8.6 |
| XG-088 | 2.1 | 320-A5 | 11.4 | 6.1 | 0.35 | >69 | — | 20.3 |
| Unstabilized Polypropylene | — | — | — | — | — | 1 | 4.3 | 1.1 |

(a)3.0 grams used
(b)hydrogen used was 32 mmole in all runs.

The data in Table II show that the polypropylene produced in the reactor by the inventive method had good yield and stereoselectivity, and also had significant level of thermo-oxidative stability, as shown by both oven aging and oxidative induction time (OIT) of the polypropylene, compared to polypropylene which was polymerized without the novel particles. Polypropylene yield increased with increasing TEA concentration. The bulk density of the polypropylene was higher than conventional polypropylene powder.

Thus, it can be seen that the process of the present invention can be advantageously employed to efficiently produce a resin containing dispersed additives avoiding the further extrusion pelletization of the resin. This means that polymerization to produce a highly stable product can be accomplished with an expenditure of a minimum of man-hours and minimal equipment costs compared with known techniques.

The production of concentrates or masterbatches of stabilizer, pigments and other additives is an important segment of the polymer industry. Before fabrication the concentrates (containing additive) are blended with an amount of polymer, to achieve a desired final additive concentration. The current concentrate manufacturing technology involves extrusion (often with expensive twin-screw equipment) or other mechanical mixing process. Screw and barrel cleaning, maintenance problems, energy cost, heat sensitivity of some additives and pelletization often present problems in such operations. This invention presents a lower energy, non-extrusion route to additive or pigment concentrate preparation.

In Example 2 above, the fluidized bed coating of the stabilizers produced a concentrate with 50% stabilizer in a carrier of isotactic polypropylene wax. In Examples 3 and 4, the concentrate produced had 83% and 69% stabilizer. The additive concentraton in the masterbatch was controlled by the coating layer thickness.

Concentrates suitable for polyethylene (PE) resins can be prepared by fluidized bed coating of additive or pigment by PE was or other PE resin.

What is claimed is:

1. A process for providing in-reactor stabilization of a polyolefin during a polymerization reaction comprising the steps of:
    forming a particulate adapted for use in polyolefin polymerization reactions, by the steps consisting of
    heating until liquid a polyolefin wax;
    fluidizing with a hot gas, additive particles selected from the group consisting of an antioxidant, a processing stabilizer, an acid acceptor, and mixtures thereof;
    spraying the liquid polyolefin wax on the heated fluidized additive particles; and
    maintaining the fluidized additive particles at a temperature which is sufficient to prevent the formation of fibers and adequate to form discrete substantially coated additive particles;
    adding said discrete substantially coated additive containing particles to a polymerization reactor and using a magnesium supported titanium halide/aluminum alkyl catalyst system wherein said system comprises
    (i) a procatalyst compound obtained by halogenating a magnesium compound of the formula MgR'R" wherein R' is an alkoxide or aryloxide group or halogen, and R" is an alkoxide, alkyl carbonate, aryloxide, or halogen with a halide of tetravalent titanium and electron donor, contacting the halogenated product with a tetravalent titanium halide, washing it to remove unreacted titanium and an electron donor, contacting the halogenated product with a tetravalent titanium halide, washing it in an inert solvent to remove unreacted titanium compounds and recovering the solid product;
    (ii) a cocatalyst component comprising an organo-aluminum compound selected from the group comprising diethyl aluminum chloride, ethyl aluminum dichloride, ethyl aluminum sesquichloride and tri-ethyl aluminum; and
    (iii) a selectivity control agent selected from the group comprising; diphenyl dimethoxy silane, paraethoxy benzoate, ethyl paratoluate, paramethoxy ethyl benzoate, phenyl triethoxysilane and 2,2,6,6-tetramethyl piperidine.

2. The process of claim 1, wherein the olefin polymerization reaction is for the polymerization of an olefin having 2-18 carbon atoms.

3. The process of claim 1, wherein the olefin polymerization reaction is a 1-butene polymerization reaction.

4. The process of claim 1, wherein the olefin polymerization reaction is a propylene polymerization reaction.

5. The process of claim 1, wherein the additive used to form said particulate is a member of the group; 1,3,5-trimethyl-2,4,6-tris(3,5-di-tert-butyl-4-hydroxybenzyl) benzene; octadecyl 3-(3',5'-di-tert-butyl-4'-hydroxphenyl)propionate; tetrakis[methylene (3,5-di-tert-butyl-4-hydroxyhydrocinnamate)]methane; tris(3,5-di-t-butyl-4-hydroxybenzyl)isocyanurate; 3,5-di-tert-butyl-4-hydroxyhydrocinnamic acid triester with 1,3,5-tris(2-hydroxyethyl)-s-triazine-2,4,6(1H,3H,5H)-trione; 1,3,5-tris(4-tert-butyl-3-hydroxy-2,6-dimethylbenzyl) 1,3,5-triazine-2,4,6-(1H,3H,5H)-trione; bis-[3,3-bis(4'hydroxy-3'tert-butyl-phenyl)-butanoic acid]-glycolester;

2,2'-methylene-bis-[(4-methyl-6-tertiary-butyl-phenyl)-terephthalate]; 2,2-bis[4-(2-(3,5-di-tert-butyl-4-hydroxyhydrocinnamoyloxy)) ethoxy-phenyl]propane; calcium bis[monoethyl(3,5-di-tert-butyl-4-hydroxybenzyl)phosphonate]; 1,2-bis(3,5-di-tert-butyl-4-hydroxyhydrocinnamoyl)hydrazine; and 2,2'-oxamidobis-[ethyl 3-(3,5-di-tert-butyl-4-hydroxyphenyl)propionate].

6. The process of claim 1, wherein the polyolefin wax coating used to form said particulate comprises a polyolefin having 2–18 carbon atoms per repeat unit.

7. The process of claim 1, wherein said fluidization of the bed of solid additive is performed using a member of the group consisting of air, inert gas, and mixtures thereof.

8. The process of claim 1, wherein said polymerization reactor is a gas phase polymerization reactor.

9. The process of claim 1, wherein said polymerization reactor is a liquid pool polymerization reactor.

10. The process of claim 1, wherein said polymerization reactor is a solvent/slurry polymerization reactor.

11. The process of claim 1, wherein said polymerization reactor is a solution polymerization reactor.

* * * * *